United States Patent [19]

Armstrong

[11] Patent Number: 4,691,904

[45] Date of Patent: Sep. 8, 1987

[54] AUTOMATIC OR STANDARD TRANSMISSION HANDLING DEVICE

[75] Inventor: Max D. Armstrong, Des Moines, Iowa

[73] Assignee: Robert J. Williams, Des Moines, Iowa ; a part interest

[21] Appl. No.: 763,670

[22] Filed: Aug. 8, 1985

[51] Int. Cl.[4] .......... B23Q 3/00

[52] U.S. Cl. .......... 269/17; 269/50; 269/51; 269/71; 269/296; 254/DIG. 16

[58] Field of Search .......... 269/17, 50-52, 269/69-71, 296; 254/134, DIG. 16

[56] References Cited

U.S. PATENT DOCUMENTS

| | | | |
|---|---|---|---|
| 1,344,385 | 6/1920 | Crays | 269/50 |
| 1,823,204 | 9/1931 | Long | 269/17 |
| 1,851,449 | 3/1932 | Royal et al. | |
| 2,568,508 | 9/1951 | Montague | 269/51 |
| 2,654,147 | 10/1953 | Wilson et al. | 269/17 |
| 2,825,477 | 3/1958 | Ross | 269/296 |
| 3,040,908 | 6/1962 | Johnson | 214/1 |
| 3,582,043 | 6/1971 | Tranchero | 254/2 R |
| 3,628,772 | 12/1971 | Gaarder | 254/134 |
| 4,021,017 | 5/1977 | Adams | 254/8 B |
| 4,123,038 | 10/1978 | Meyers | 254/2 R |
| 4,269,394 | 5/1981 | Gray | 254/134 |
| 4,335,990 | 6/1982 | Apter et al. | 414/457 |
| 4,445,667 | 5/1984 | Webb | 254/134 |
| 4,538,796 | 9/1985 | Steck | 269/17 |

*Primary Examiner*—Frederick R. Schmidt
*Assistant Examiner*—Judy J. Hartman
*Attorney, Agent, or Firm*—Zarley, McKee, Thomte, Voorhees & Sease

[57] ABSTRACT

An equipment handling device is provided comprising a frame having forward and rearward ends and opposite sides. At least one extensible column structure extends upwardly from the frame. A pair of arm members are rotatably mounted on the column structure adjacent the upper end thereof and are adapted to hold equipment to be worked upon in a fixed position with respect to the arm members. The arm members are pivotable about a horizontal axis such that the equipment can be moved to a selected position for work thereon. A locking mechanism locks the arm members against rotation from the selected position. The device includes upwardly curved portions extending forwardly from the frame such that the device can be pivoted upwardly and forwardly for picking up the equipment to be worked upon.

16 Claims, 16 Drawing Figures

AUTOMATIC OR STANDARD TRANSMISSION HANDLING DEVICE

BACKGROUND OF THE INVENTION

It is desirable to be able to move equipment which needs mechanical work into an appropriate position for such work. However, much of the equipment, such as automatic or standard transmissions and the like, are too large, heavy and/or awkward to easily position for the necessary work thereon.

Therefore, a primary objective of the present invention is the provision of a device for holding a piece of equipment to be worked on in a selected position.

A further objective of the present invention is the provision of an equipment handling device which supports the equipment in any one of a number of desired positions.

A further objective of the present invention is the provision of an equipment handling device which permits easy pick up of the equipment and secure support of the equipment in a selected position.

Still another objective of the present invention is the provision of an equipment handling device which is portable.

Another objective of the present invention is the provision of an equipment handling device wherein the equipment can be raised or lowered to a comfortable height for the mechanic.

Another objective of the present invention is the provision of an equipment handling device having a lock mechanism to insure that the equipment is securely held in a desired position.

A further objective of the present invention is the provision of a device for supporting various types of equipment, such as automatic or standard transmissions.

Still a further objective of the present invention is the provision of an equipment handling device which is economical to manufacture and durable and safe in use.

SUMMARY OF THE INVENTION

The equipment handling device of the present invention includes a frame having forward and rearward ends and opposite sides. An extensible column structure extends upwardly from the frame and has a hydraulic or air cylinder operatively connected thereto for raising and lowering the upper end of the column structure. A horizontally disposed elongated shaft is rotatably mounted on the column structure and has a pair of arm members attached thereto for rotation therewith. The arm members are adapted to securely support the equipment to be worked on which is moved to the desired working position by rotation of the arm members about the longitudinal axis of the shaft. At least one of the arm members is slidably mounted on the shaft such that the spacing between the arms can be adjusted. A locking mechanism is provided to prevent the shaft from rotating from the desired position and includes a ratchet wheel and pawl assembly. A friction brake is also provided on the shaft to inhibit rotation. An upwardly curved portion extends forwardly from each of the opposite sides of the frame such that the entire device is tiltable forwardly and upwardly upon the curved portions to facilitate initial pick up of the equipment to be worked upon. Wheels are provided on the frame for portability.

FI G. 12 is a side elevation view showing the device tipped forwardly and upwardly for picking up an automatic or standard transmission.

Figure 13:
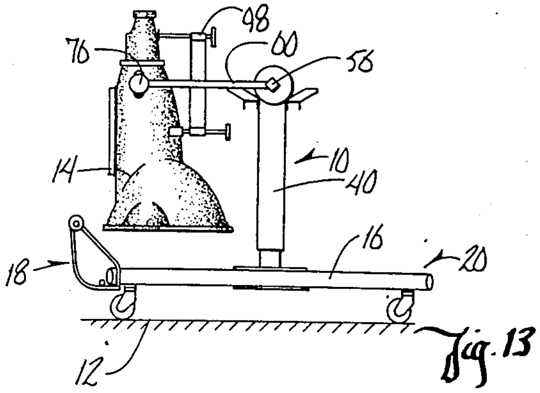
Figure 14:
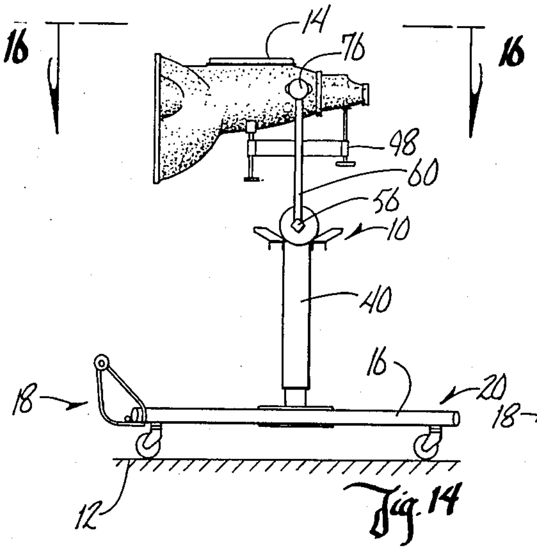
Figure 15:
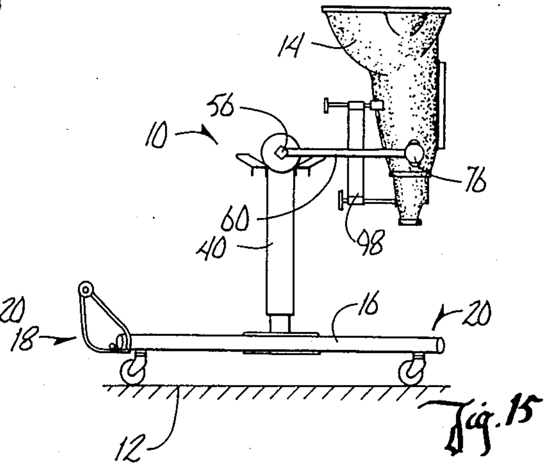

FIGS. 13-15 are side elevation views showing the device in a work position with the automatic or standard transmission being supported by the device in three different positions.

Figure 16:
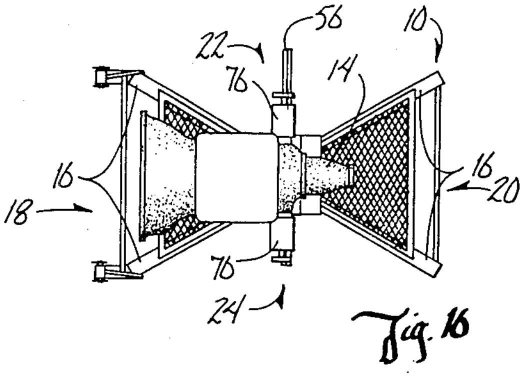

FIG. 16 is a top plan view taken along lines 16—16 of FIG. 14.

DETAILED DESCRIPTION OF THE DRAWINGS

In the Figures, the reference numeral 10 generally designates the equipment handling device of the present invention, while the numeral 14 designates a support surface upon which device 10 is supported and numeral 14 designates the equipment to be supported by device 10, such as the automatic or standard transmission shown in FIGS. 9-16. It is understood that support surface 12 may be a floor or any other horizontally disposed surface, such as a work bench.

Device 10 includes a frame 16 having a forward end 18, a rearward end 20, and opposite sides 22, 24. Wheels 26 may be mounted upon frame 16 such that device 10 is portable. Extending forwardly from each of opposite sides 22, 24 is an upwardly curved member 28 which permits device 10 to be tipped from the normal work position shown in FIGS. 13-15 to the equipment pickup position shown in FIG. 12. A wheel assembly 30 is rotatably supported by a bearing 32 at the upper extremity of each curved member 28 for maneuvering device 10 when tilted upwardly and forwardly upon the curved members. A brace 34 extends from bearing 32 to frame 16 for structural stability. Also, a forward cross bar 36 and a rearward cross bar 38 extend between opposite sides 22, 24 of frame 16 at the respective ends thereof, and are engageable by a person for tilting device 10 between the work position and equipment pickup position.

Figure 2:
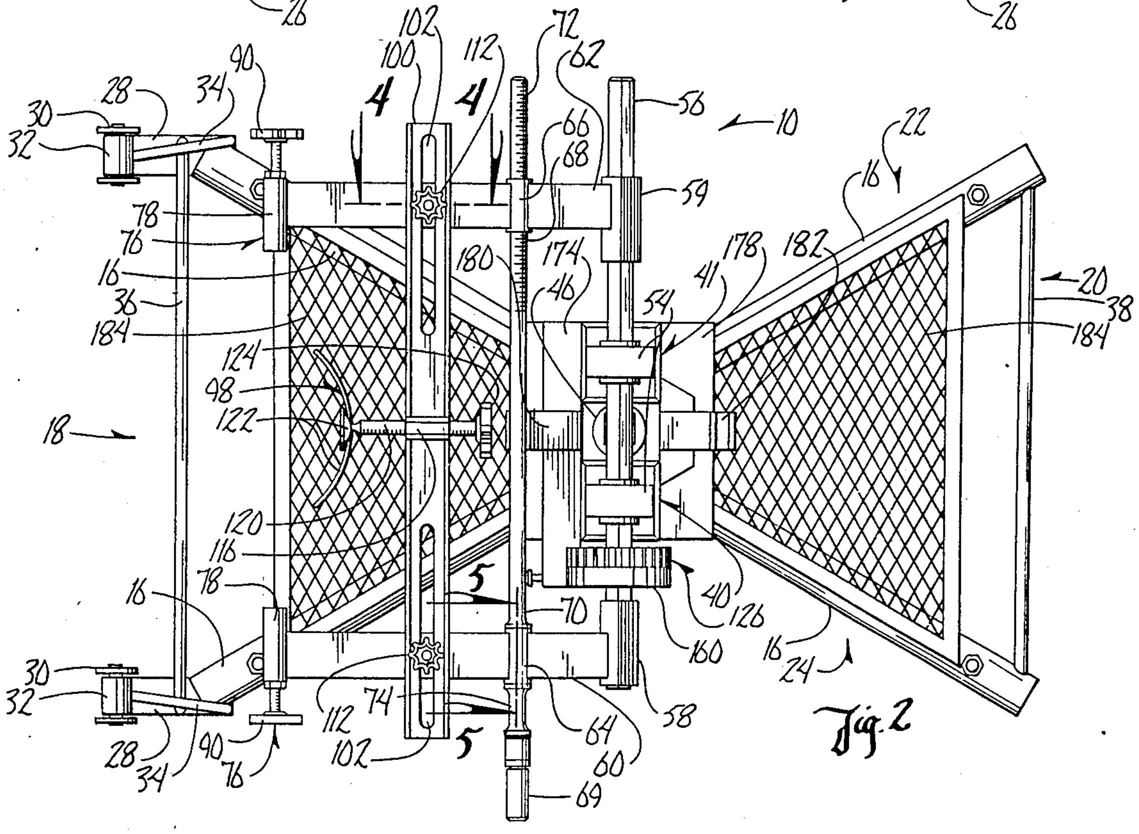
FIG. 2 is a top plan view of the device of the present invention.

While FIGS. 2 and 16 show frame 16 to be in an X configuration, it is understood that frame 16 may take any structurally stable configuration without departing from the scope of the present invention.

Figure 1:
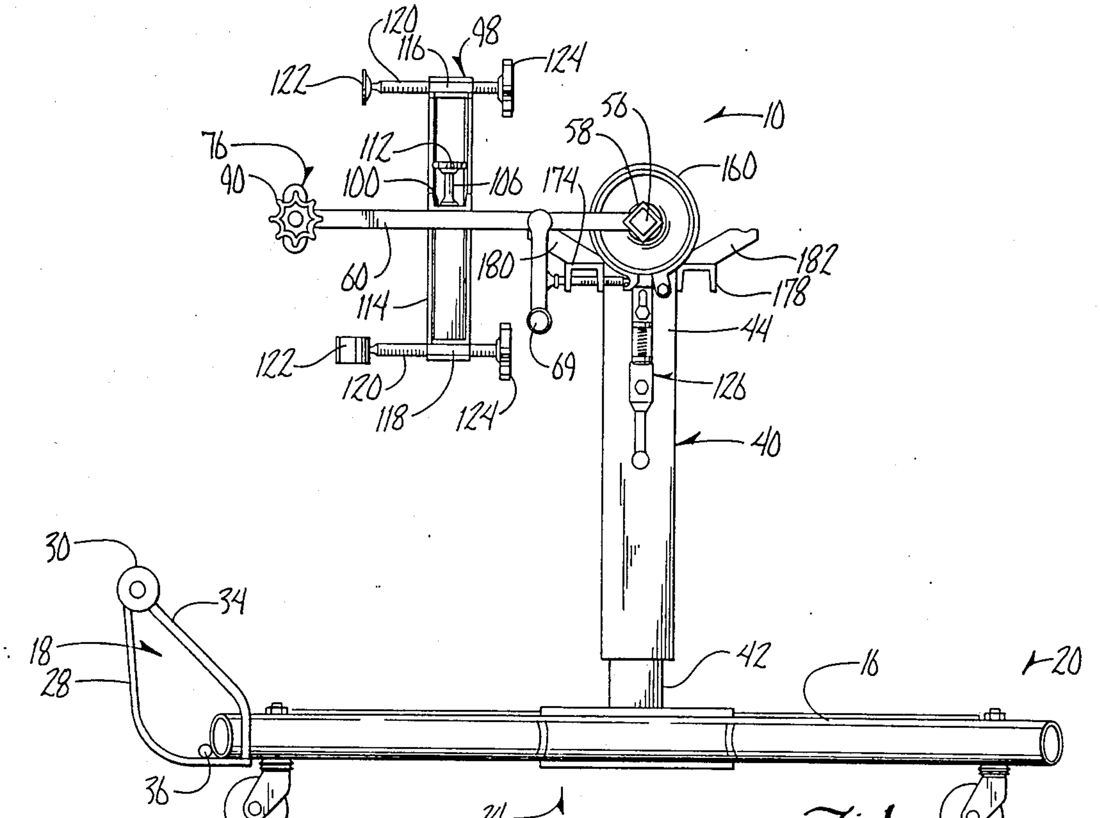
FIG. 1 is a side elevation view of the device of the present invention.
Figure 3:
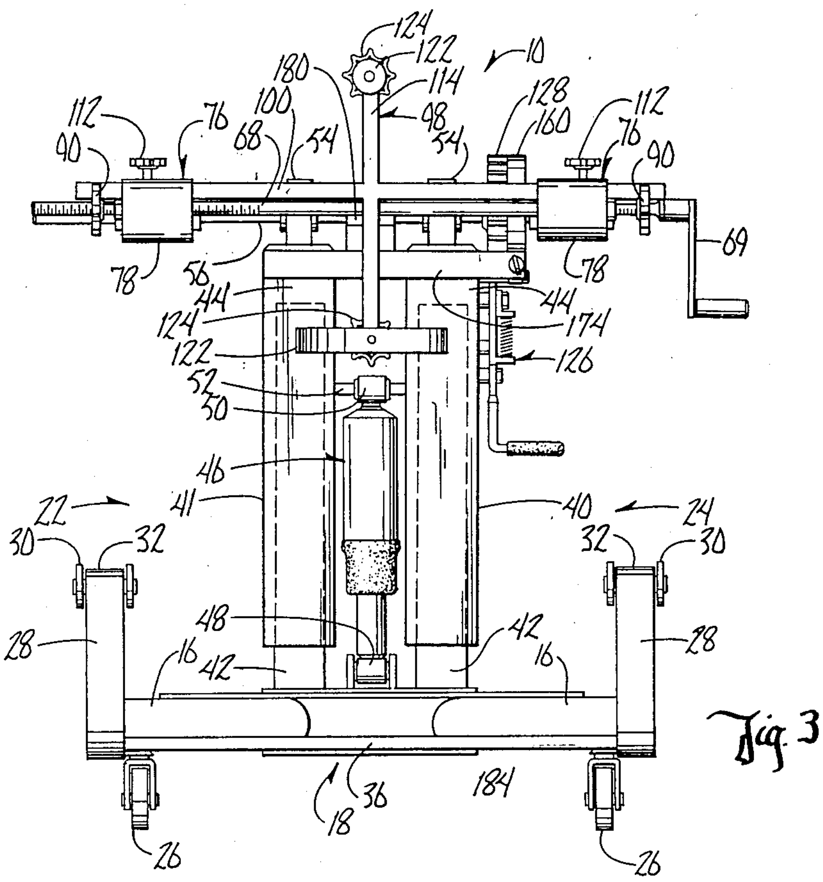
FIG. 3 is a front elevation view of the device of the present invention.
Figure 4:
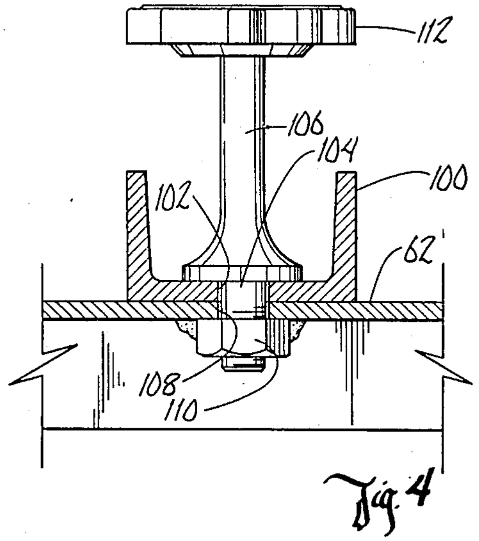
FIG. 4 is a partial sectional view taken along lines 4—4 of FIG. 2.

A pair of column structures 40 and 41 extend upwardly from frame 16, as best seen in FIGS. 1 and 3. Each column structure 40, 41 includes a base 42 rigidly secured to frame 16 and an extensible upper portion 44 telescopically positioned on base 42 for vertical movement with respect thereto. A hydraulic or air cylinder 46 has a lower end 48 connected to frame 16 and an upper end 50 connected to a rod 52 interconnecting upper portions 44 of column structures 40 and 41 such that hydraulic or air cylinder 46 is vertically disposed. Cylinder 46 is connected in conventional manner to a hydraulic fluid or air source (not shown) such that the cylinder is extensible to raise and lower upper portions 44 with respect to base portions 42. While the figures show dual column structures 40, 41, it is understood that more or less column structures may be required, depending on the size and weight of equipment 14 to be supported by device 10.

Each column structure 40, 41 also includes a bearing 54 at the upper end thereof through which an elongated shaft 56 is rotatably journaled. Shaft 56 is horizontally disposed and extends substantially across the width of frame 16.

Figure 5:
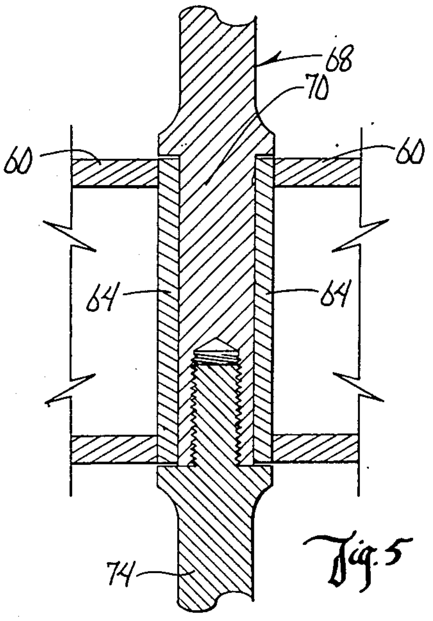
FIG. 5 is a partial sectional view taken along lines 5—5 of FIG. 2.

A pair of collars 58 and 59 are matingly received upon shaft 56 and each collar 58, 59 has an arm member 60 or 62 extending therefrom, respectively, so as to be rotatable with shaft 56. While shaft 56 is shown to be square in cross-section, it is understood that it may be circular in cross section, with collars 58, 59 being mounted thereon with set screws or the like such that arm members 60, 62 are secured to shaft 56. Also, it is desirable that at least one of collars 58 or 59 is slidable upon shaft 56 such that the spacing between arm members 60, 62 is laterally adjustable. To facilitate such lateral movement of one arm member with respect to the other, each arm member 60, 62 includes a bearing 64, 66, respectively, through which an elongated shaft 68 extends. Shaft 68 has a first end 70 rotatably supported by bearing 64, and a threaded second end 72 threadably received within bearing 66 such that rotation of shaft 68 causes arm 62 to move toward or away from arm 60 as collar 59 slides upon shaft 56. A crank shaft 74 is threaded into first end 70 of shaft 68, as seen in FIG. 5, and is adapted to receive a crank handle 69 for rotating shaft 68 about its longitudinal axis.

At the outer extremity of each arm 60, 62 opposite collars 58, 59 is a first support means 76 which is adapted to securely engage a portion of equipment 14 and supporting the equipment in a fixed position with respect to the arm members. More particularly, each support means 76 includes a flattened tubular member 78 secured to the respective arm member 60, 62 by welding or the like. Tube member 78 has a closed end 80 and an open end 82. Closed end 80 has an aperture 84 therein with a nut 86 welded over said aperture such that a threaded shaft 88 is threadably extensible through said nut and aperture. A handle 90 is mounted upon the outer end of shaft 88 in any convenient manner, such as by a screw 92.

Figure 11:
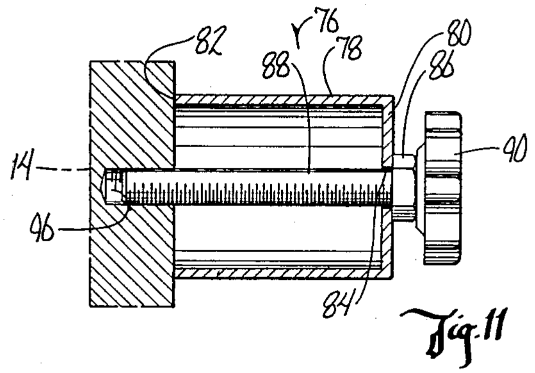
FIG. 11 is a view similar to FIG. 10 showing the support means matingly threaded within a receiving aperture on another automatic or standard transmission.

Open end 82 of tubular member 78 is adapted to receive a tab 94 on equipment 14, such that the equipment is held in position between the opposing first support means 76 on arm members 60, 62 as shown in FIG. 16. Tab 94 is conventional on many transmissions and is similar to lips or flanges found on other types of equipment. In the alternative, some equipment includes threaded apertures 96 in which shaft 88 can be matingly received, as shown in FIG. 11, for supporting equipment 14 between arm members 60, 62. It is understood that the structure of first supporting means 76 may be varied from that shown in the figures to accommodate the particular equipment to be supported thereby without departing from the scope of the present invention. Also, it may be desirable to have interchangeable supporting means of various configurations.

A second support means 98 is also mounted upon arm members 60, 62 for support and engagement of equipment 14. As seen in FIGS. 2 and 3, second support means 98 includes a horizontally disposed crossbar 100 which is supported by arm members 60, 62. Cross bar 100 has an elongated slot 102 at either end thereof for receiving the threaded shaft 104 of a bolt means 106. Each shaft 104 extends through an aperture 108 in the respective arm members 60, 62 and is threadably received by a nut 110 welded to the underside of the respective arm member in alignment with aperture 108. Thus, bolt means 106 may be loosened to permit lateral movement of crossbar 100 with respect to arm members 60, 62 and may be tightened to hold crossbar 100 in the selected position on arm members 60, 62. An enlarged handle 112 may be provided on bolt means 106 to provide easy loosening and tightening of the bolt means.

Crossbar 100 also has a vertically disposed cross arm 114 formed therewith at the approximate midpoint of the crossbar, as best seen in FIG. 3. Cross arm 114 includes an upper bearing 116 and a lower bearing 118 at the upper and lower ends thereof, respectively. Each bearing 116 and 118 is threaded and adapted to receive a threaded shaft 120. Each shaft 120 includes a head member 122 at one end thereof for engaging a portion of equipment 14 and a handle 124 at the opposite end thereof for adjusting the spacing between head member 122 and cross arm 114. While the figures show head members 122 of second support means 98 to be of different shapes and to abuttingly engage a portion of equipment 14, as seen in FIGS. 12-15, it is understood that head members 122 may be of any desired shape and may be designed similar to first support means 76 so as to retentatively receive or engage a particular portion of equipment 14.

Figure 6:
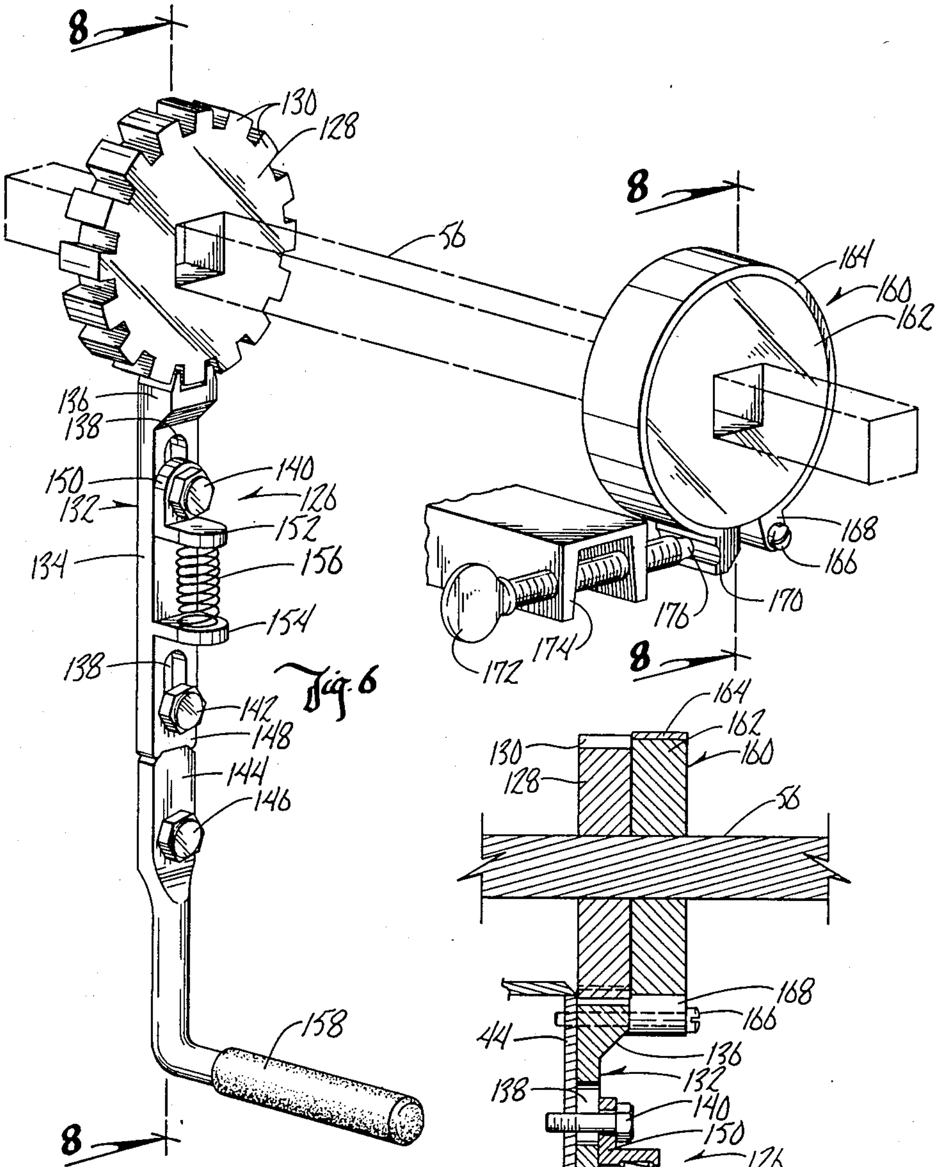
FIG. 6 is a partial perspective view showing the locking mechanism of the device in a locked position.
Figure 7:
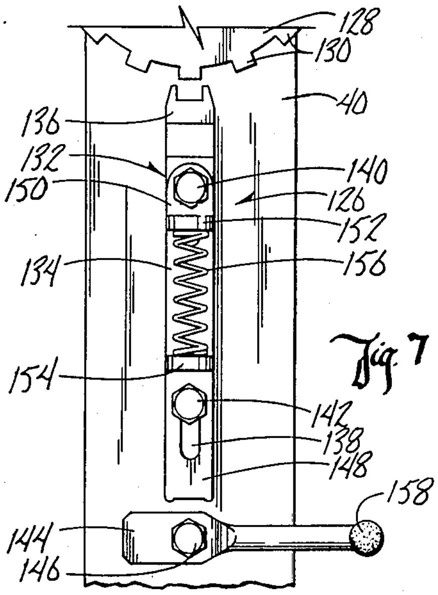
FIG. 7 is a partial front elevational view of the locking mechanism in an unlocked position.
Figure 8:
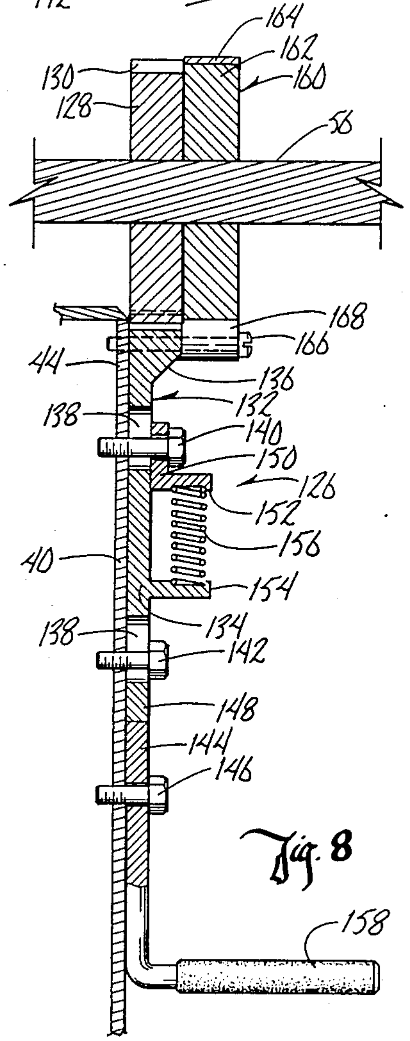
FIG. 8 is a sectional view of the locking mechanism taken along lines 8—8 of FIG. 6.
Figure 9:
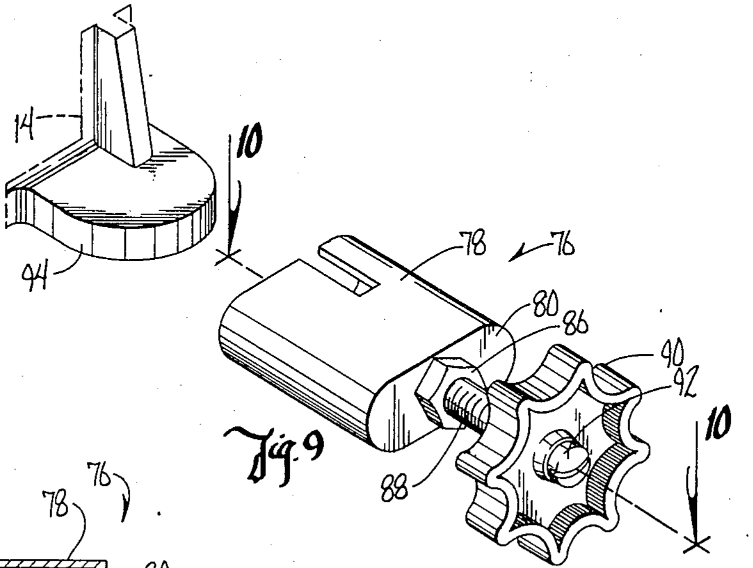
FIG. 9 is a perspective view of the equipment support means prior to engagement with an automatic or standard transmission tab.
Figure 10:
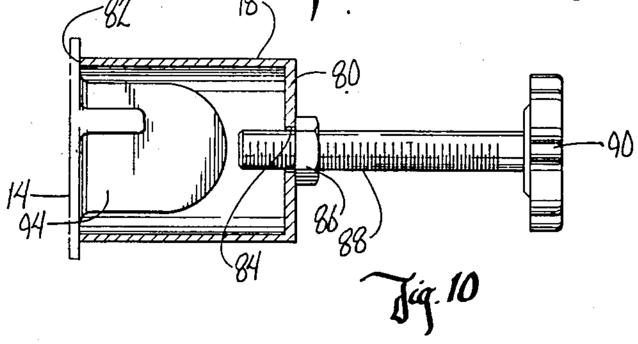
FIG. 10 is a sectional view taken along lines 10—10 of FIG. 9 showing the transmission tab received in the support means.

The locking mechanism of the present invention is generally designated by the reference numeral 126 and is shown in detail in FIGS. 6-8. Locking mechanism 126 includes a ratchet wheel 128 mounted upon shaft 56 and having a plurality of teeth 130 on the perimeter thereof and a pawl unit 132 adapted to engage wheel 128 to prevent rotation thereof. Pawl unit 132 includes a first section 134 having an upper end 136 which engages one of teeth 130 of ratchet wheel 128 to prevent wheel 128 and shaft 56 from rotating. First section 134 includes a pair of slots 138 therein through which a pair of bolt members 140, 142 extend. Bolt members 140, 142 are received within column structure 40 and permit first section 134 to slide upwardly and downwardly with respect to ratchet wheel 128. A second section 144 of pawl unit 132 is pivotally mounted to column structure 40 by a bolt member 146 adjacent the lower end 148 of first section 134. A third pawl section 150 is mounted upon upper bolt member 140 and has an outwardly extending lip 152. A similar outwardly extending lip 154 is integrally formed on first section 134, with a spring 156 being positioned between lips 152 and 154.

Locking mechanism 126 can be moved from a locked position as shown in FIG. 6, to an unlocked position, as shown in FIG. 7, by pivoting second pawl section 144 about bolt member 146. In the locked position, second section 144 engages the lower end 148 of first section 134 such that the first section slides upwardly along bolt members 140, 142 until the upper end 136 thereof engages one of teeth 130 on ratchet wheel 128. To unlock mechanism 126, second pawl section 144 is pivoted about bolt member 146 out of engagement with first section 134 such that spring 156 forces the first section downwardly along bolt members 140, 142, thereby disengaging the upper end 136 thereof from teeth 130 of ratchet wheel 128. Second section 144 may be provided with a handle 158 to facilitate the pivotal movement thereof.

Locking mechanism 126 further includes a friction brake generally designated by the reference numeral 160. Brake 160 includes a brake pad 162 mounted upon shaft 56 and a brake shoe 164 secured to column structure 40 in any convenient manner, such as by screw 166. More particularly, brake shoe 164 has a first end 168 attached to column structure 40 by screw 166 and a second free end 170. A tension screw 172 is threadably received within a brace member 174 connected to column structures 40 and has an inner end 176 which engages second end 170 of brake shoe 164. Thus, clockwise or counterclockwise turning of tension screw 172 increases or decreases, respectively, the friction between brake shoe 164 and brake pad 162, thereby inhibiting rotation of shaft 56. It is noted that FIG. 6 shows friction brake 160 spaced apart from ratchet wheel 128 for purposes of clarity. Preferably, friction brake 160 and ratchet wheel 128 are positioned closely to one another upon shaft 56, as shown in FIG. 8. It is understood that locking mechanism 126 can be positioned anywhere along shaft 56.

Brace member 174 is secured to the forward faces of column structures 40, 41 while a similar brace member 178 is secured to the rearward faces thereof. As best seen in FIG. 1, a forward arm support 180 extends upwardly and forwardly from brace member 174 while a rearward arm support 182 extends upwardly and rearwardly from brace member 178. Arm supports 180 and 182 are adapted to supportingly engage shaft 68 when shaft 56 and arm members 60, 62 are in the positions shown in FIGS. 13 and 15, respectively. Thus, arm supports 180, 182 provide structural stability to device 10 when the center of gravity of equipment 14 is substantially spaced apart from column structures 40, 41.

A grate 184 or similar support plate is secured to frame 16 for supporting drainage pans, tools or other supplies close to the working station provided by device 10.

Figure 12:
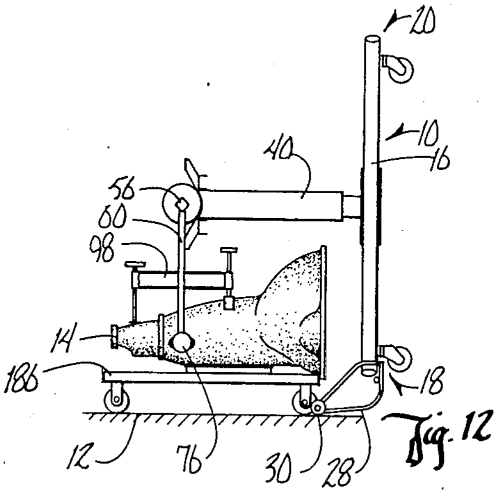

In operation, device 10 is normally in a work position wherein frame 16 or wheels 26 thereon engage support surface 12 such that frame 16 is substantially horizontally disposed and column structures 40, 41 are substantially vertically disposed. Device 10 can be tilted upwardly and forwardly upon curved members 28 into the equipment pick-up position shown in FIG. 12 wherein first support means 76 of arm members 60, 62 are secured to equipment 14. In FIG. 12, equipment 14 is shown to be on a transport cart 186, however, it is understood that equipment 14 may be picked up from support surface 12. After first support means 76 are secured to equipment 14, device 10 is pivoted downwardly and rearwardly into the work position shown in FIGS. 13–15 wherein equipment 14 is supported in a fixed position relative to arm members 60, 62 by first support means 76 and second support means 98. Shaft 56 and arm members 60, 62 can be rotated substantially 180° from the position shown in FIG. 13 to that shown in FIG. 15, as required by the mechanic doing work on equipment 14. When equipment 14 is in the desired position anywhere along the arc of rotation of arm members 60, 62, locking mechanism 126 is actuated to securely lock the arm members against further rotation. Upper portions 44 of column structures 40, 41 can be raised or lowered to adjut the height of equipment 14 by actuation of hydraulic or air cylinder 46.

Rotation of shaft 56 and arms 60, 62 is accomplished manually by lifting equipment 14 itself after being secured to first support means 76, or by providing a crank (not shown) on one end of shaft 56. Also, it is understood that additional power means can be operatively connected to shaft 56 to impart rotation thereto.

Thus, from the foregoing it is seen that device 10 of the present invention permits large, heavy and/or awkward equipment such as an automatic or standard transmission, to be easily picked up and moved to a selected position for work thereon. Thus, the device of the present invention accomplishes at least all of the stated objectives.

What is claimed is:

1. An equipment handling device, comprising:
   - a frame having forward and rearward ends and opposite sides;
   - column means extending upwardly from said frame and having a first end fixed to said frame and a spaced apart second end;
   - a horizontally disposed elongated shaft mounted on said second end of said column means;
   - arm means having a first end mounted on said shaft and a spaced apart second end;
   - support means on said arm means for holding said equipment remote from said first end of said arm means;
   - said arm means being pivotable about a horizontal axis defined by the longitudinal axis of said shaft whereby said equipment is selectively positionable along an arc centered on said horizontal axis for work thereon;
   - said arm means including a pair of spaced apart arm members each being mounted on said shaft for rotation therewith;
   - said arm members each including first support means for securely engaging a first portion of said equipment and supporting said equipment in said fixed position;
   - second support means mounted on said arm means for engaging a second portion of said equipment to hold said equipment in said fixed position; and
   - said second support means including a crossbar extending between said arm members and having at least one head member thereon for engaging said equipment.

2. The device of claim 1 wherein said device is normally in a first equipment work position and said frame includes an upwardly curved portion extending forwardly from each of said opposite sides at said forward end thereof such that said device is tiltable forwardly and upwardly upon said curved portions into a second equipment pick-up position wherein said arm means extend downwardly toward the equipment to facilitate the picking-up of the equipment from a low elevation.

3. The device of claim 2 wherein each of said curved portions has a wheel thereon adjacent the upper extremity thereof.

4. The device of claim 2 wherein said frame further includes a first and a second crossbar extending between said opposite sides adjacent said forward and rearward ends, respectively, said crossbars being engagable by a person for tilting said device between said first and second positions.

5. The device of claim 1 wherein the spacing between said first and second ends of said column means is selectively adjustable.

6. The device of claim 5 further comprising hydraulic means operatively connected to said column means for extending and retracting said second end of said column means with respect to said first end thereof.

7. The device of claim 1 wherein at least one of said arm members is slidably mounted on said shaft for lateral movement with respect to said frame.

8. The device of claim 1 wherein each of said first support means includes a tubular member having an open end adapted to receive a tab on said equipment whereby said equipment is securely positioned between said arm members.

9. The device of claim 1 wherein each of said first support means includes a threaded shaft adapted to matingly engage a threaded aperture on said equipment whereby said equipment is securely positioned between said arm members.

10. The device of claim 1 wherein said first support means on said arm members are disposed towards one another.

11. The device of claim 1 wherein said crossbar is slidably mounted between said arm members such that said head member is laterally adjustable with respect to said arm members.

12. The device of claim 1 further comprising locking means operatively engaging said arm means to limit rotation thereof such that said equipment is lockingly positionable at any location along the arc of rotation of said arm means.

13. The device of claim 12 wherein said shaft is rotatable and said locking means includes a ratchet wheel having a plurality of teeth on the perimeter thereof rigidly mounted on said shaft for rotation therewith and a pawl attached to said column means adapted to releasably engage one of said teeth to prevent rotation of said shaft.

14. The device of claim 13 wherein said locking means further includes a friction brake operatively mounted on said shaft for inhibiting rotation of said shaft.

15. The device of claim 13 wherein said pawl includes a first section slidably mounted on said column means and having an end for releasably engaging said teeth of said ratchet wheel, a second section pivotally attached to said column means and being pivotal between a first position wherein said first section is engaged and held in engagement with said teeth of said ratchet wheel and a second position wherein said first sectin is disengaged, and a spring for urging said first section out of engagement with said teeth of said ratchet wheel when said second section is in said second position.

16. An equipment handling device, comprising:

a frame having forward and rearward ends and opposite sides;

column means extending upwardly from said frame and having a first end fixed to said frame and a spaced apart second end;

a horizontally disposed elongated shaft rotatably mounted on said column means;

a pair of spaced apart arm members mounted on said shaft for rotation therewith;

first support means on each arm member for securely engaging a first portion of said equipment and supporting said equipment in a fixed position with respect to said arm members;

second support means mounted on said arm members for engaging a second portion of said equipment to hold said equipment in said fixed position, said second support means including a crossbar extending between said arm members and having at least one head member thereon for engaging said equipment;

said shaft and said arm members being pivotable about the longitudinal axis of said shaft whereby said equipment is selectively positionable for work thereon.

* * * * *